(12) United States Patent
Roth et al.

(10) Patent No.: US 6,908,241 B1
(45) Date of Patent: Jun. 21, 2005

(54) CARD PROCESSING SYSTEM WITH COMBINED MAGNETIC ENCODER AND CARD FLIPPER

(75) Inventors: Philip M. Roth, Flanders, NJ (US); Keith R. Ashley, Clark, NJ (US); Yook Chan, South Amboy, NJ (US); David J. Haas, Mahwah, NJ (US); Igor Pankiw, Hillside, NJ (US)

(73) Assignee: Card Technology, Paramus, NJ (US)

( * ) Notice: Subject to any disclaimer, the term of this patent is extended or adjusted under 35 U.S.C. 154(b) by 0 days.

(21) Appl. No.: 10/800,860

(22) Filed: Mar. 16, 2004

(51) Int. Cl.[7] .............................................. G06K 5/00
(52) U.S. Cl. ........................ 400/521; 400/188; 235/380; 235/449
(58) Field of Search ................................ 400/188, 521, 400/525, 536; 235/380, 449; 347/218

(56) References Cited

U.S. PATENT DOCUMENTS

| | | | |
|---|---|---|---|
| 4,806,744 A | * | 2/1989 | Briane et al. ............... 235/477 |
| 5,326,179 A | * | 7/1994 | Fukai et al. ................ 400/521 |
| 5,709,484 A | | 1/1998 | Dorner |
| 5,959,278 A | * | 9/1999 | Kobayashi et al. .......... 235/449 |
| 5,962,832 A | | 10/1999 | Dorner |
| 6,261,012 B1 | | 7/2001 | Haas et al. |
| 6,598,794 B1 | * | 7/2003 | Ishii ........................... 235/449 |
| RE38,295 E | * | 11/2003 | Kobayashi et al. .......... 235/449 |
| 6,830,392 B2 | * | 12/2004 | Kobayashi et al. ..... 400/120.01 |

* cited by examiner

Primary Examiner—Andrew H. Hirshfeld
Assistant Examiner—Dave A. Ghatt
(74) Attorney, Agent, or Firm—Antonelli, Terry, Stout & Kraus, LLP

(57) ABSTRACT

A system for processing cards including a magnetic medium extending along one side of the cards and printing on both sides of the cards is disclosed. The system is a plurality of card processing stations (14, 30, 24) spaced along a card transport (18') extending between a card input 12 and a card output 16. A first drive motor (54) drives a transmission (60) coupling the motor to a card drive associated with each station to transport the cards at each station during processing thereof. A second drive motor 56 rotates a combined magnetic encoding and card flipping station. A controller 60 controls operation of the stations and the first and second motors so that the combined magnetic encoding and flipping station flips the cards to a reverse orientation to print a second side.

34 Claims, 9 Drawing Sheets

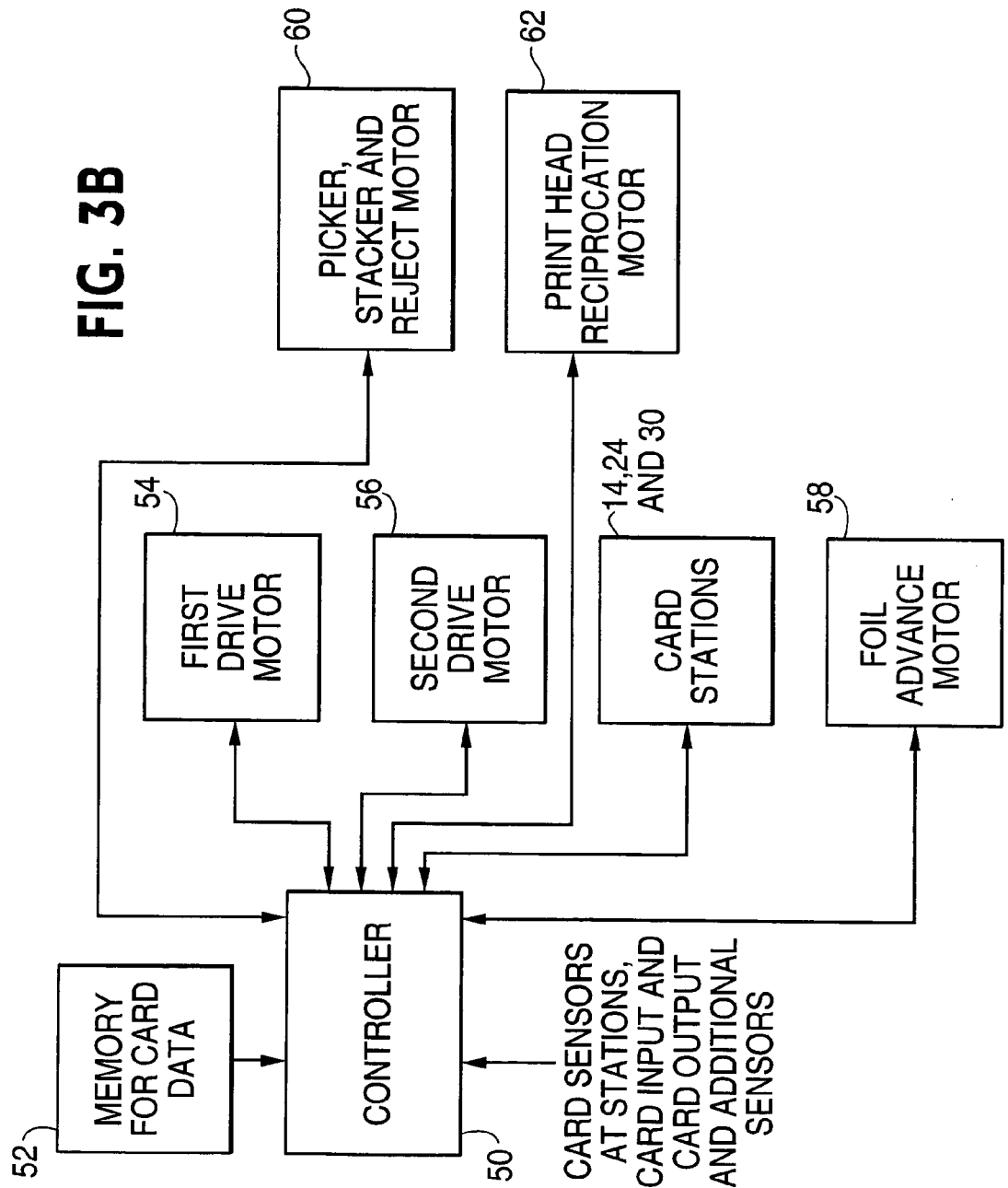

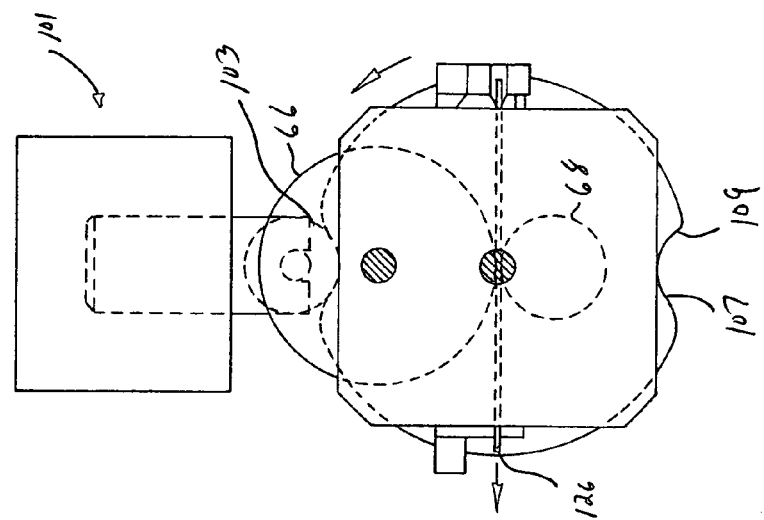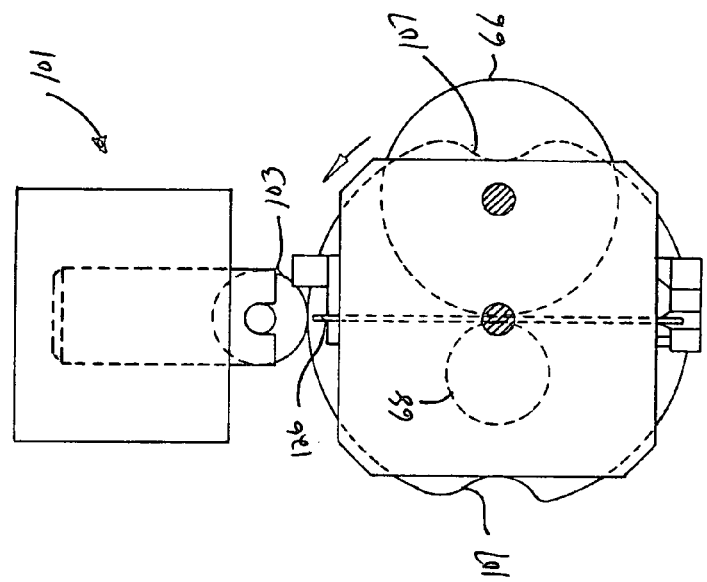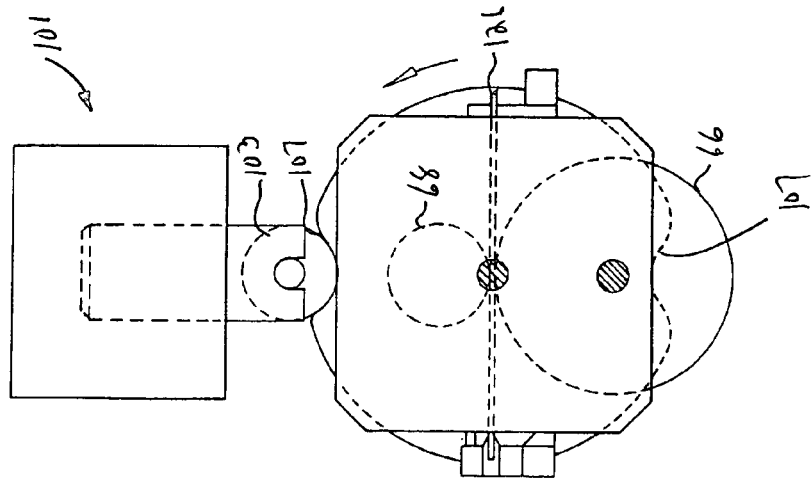

CARD PROCESSING SYSTEM WITH COMBINED MAGNETIC ENCODER AND CARD FLIPPER

BACKGROUND OF THE INVENTION

1. Field of the Invention

The present invention relates to printing systems which print on two sides of a card and further magnetically encode a magnetic medium extending along one side.

2. Description of the Prior Art

FIGS. 1A and 1B respectively illustrate a top side and a bottom side of a conventional prior art plastic card of the non-embossed type to which the present invention relates. The top side includes printing which is thermally fused using a resin or dye-sublimation (D2T2) material coated on a plastic foil carrier which is transferred to a card upon the heating of individual heating elements within the print head which individually print pixels to produce a high quality print of, for example, 300 pixels per inch or more. The smart card IC illustrated in phantom in FIG. 1A is utilized in many applications, such as Subscriber Identity Module (SIM) card which provides user identity in mobile telephony applications, and in other applications requiring onboard stored data. FIG. 1B shows the bottom side of the card including printing and a magnetic stripe upon which a bit track which may be encoded under International Standards Organization (ISO) specifications for credit and other types of cards.

The prior art printing systems, which perform double sided printing of plastic cards, including magnetic stripes such as illustrated in FIGS. 1A and 1B, use three approaches. Each of these approaches results in additional stations (when compared to the present invention) along a transport path of the printing system which contributes complexity, cost and the overall length of the system. It is desirable for printing systems for cards of the type to which the present invention relates to be as small as practically possible so as to minimize the work area which must be allocated to card processing.

The first approach is to provide a mechanism for rotating the cards located between two print stations which is hereinafter referred to as "flipping". A card which has been previously magnetically encoded to include magnetic data on the magnetic stripe at a magnetic encoding station is transported along a card transport to a first printing station where the top side is printed. Thereafter, the card is transported along the card transport to a card flipper located between the printing stations which flips the card so that the bottom side is now facing upward so that, when the card is moved to the second printing station, the bottom side is printed. This approach suffers from the disadvantage that the card flipper adds to the length of the card transport (about 4 inches in commercial products) since a separate flipper is required to be located between the first and second printing stations which further, in view of the additional length of the transport mechanism, also adds cost to the machine. Also, two printers with their foil feeding mechanisms add cost and complexity.

The second approach is to provide a separate flipper located either before or after a common print station. FIG. 2 illustrates a block diagram of the second approach in which the card flipper 22 is located before the common printing station 24. In FIG. 2, cards are supplied (picked) from a card input 12 and transported to a smart card encoding station 14 by a card transport 18. At the smart card encoding station 14, the aforementioned smart card IC, illustrated in FIG. 1A, is programmed with data provided by a conventional smart card encoder. If the smart card is not verifiably encoded correctly with the data, the card is treated as a rejected card which will not be permitted to be discharged (stacked) into the card output 16. If smart card encoding occurs without error at the smart card encoding station 14, the card is transported along the card transport 18 to a conventional magnetic stripe encoding station 20 at which the data in the form of magnetically recorded bits is encoded onto the magnetic stripe as illustrated in FIG. 1B which may be in accordance with applicable ISO standards. Thereafter, if the magnetic encoding is verified to be without error, the card will be transported ultimately by the card transport 18 to card flipper 22, to printing station 24 and then to the card output 16. The card is transported from the magnetic stripe encoding station 20 to the card flipper 22 which performs the process of rotation of the cards held therein such that the side of the card which is to be printed first at the printing station 24 (typically the side opposite the magnetic stripe) is oriented with the face on which the printing is to occur facing toward the thermally activated heating elements of the printing station 24. When the first side of the card is being printed, which is typically the face of the card illustrated in FIG. 1A, the card flipper 22 is not activated since the correct side of the card on which printing is first to occur is oriented in the right direction relative to the printing head of the printing station 24. The card moves from the card flipper into the printing station 24 where the thermally activated printer of the printing station is activated to print a pattern of pixels produced by selectively heating a linear array of individual heating elements which extend across the width of the card to print the pixels to produce the desired image on the first side to be printed. After the first side of the card is printed, the card is transported back to the card flipper 22, as indicated by the double headed arrow 26, at which the card is flipped 180° so that the side on which no printing has occurred, is now oriented to face the thermally activated linear array of heating elements of the printing station 24. Thereafter, the card is transported back to the printing station 24 for printing the second side and subsequently discharged into the card output 16. Rejected cards resultant from erroneous smart card encoding or magnetic stripe encoding are not output into the card output 16 as the result of a card reject mechanism.

The last approach uses separate printing stations facing the front and rear surfaces of the card to print the two sides. This approach eliminates the need for a card flipper but adds to cost by requiring two printers, including the required foil feeding mechanisms. The length of the card transport is not lessened in view of the addition of another printer which takes up substantially the same space as the flipper which has been eliminated.

U.S. Pat. Nos. 5,709,484 and 5,962,832 disclose apparatus for printing on double sided cards in which a flipper is provided which may also be used to encode an integrated circuit microchip.

SUMMARY OF THE INVENTION

The present invention is a system for processing cards including a magnetic medium extending along one side of the cards and printing on both sides of the cards, a combined magnetic encoder and flipper which encodes a magnetic medium on one of two sides of cards which are printed on the two sides, a method in a system for processing cards including a magnetic medium extending along one side of the cards and printing on both sides of the cards and a method in a combined magnetic encoder and flipper which encodes a magnetic medium on one of two sides of the cards which are printed on two sides.

The present invention shortens the length of a card transport used for two sided printing of cards which also contain a magnetic medium extending along one side of the cards by combining a magnetic encoder and card flipper in a single station. The invention eliminates the use of the card flipper 22 as illustrated in the prior art of FIG. 2 as a separate station along the card transport path 18. As a result, the transport path is shortened approximately 4 inches in a prototype commercial printing system in accordance with the present invention in comparison to commercial printing systems.

The present invention further shortens the overall card transport length of a printing system which is comprised of multiple serially connected systems for processing cards in accordance with the present invention. The elimination of a distinct card flipper from each of the serially connected multiple systems for processing cards in accordance with the invention substantially shortens the overall length of the system since, for each color or coating which is printed on a surface of the cards by a single printing system in accordance with the invention, the length of a separate card flipper in that system is saved.

The invention utilizes a single drive motor to drive a transmission which drives a card drive associated with the card processing stations located along the card transport path. When a combined magnetic encoding and card flipping station is rotated by a second drive motor, the single drive motor driving the transmission drives the card drive associated with each card processing station in a rotational direction to maintain the card's position centered within the combined magnetic encoding and flipping station during flipping. The flipping of the combined magnetic encoding and card flipping station by the second drive motor would, without compensation in accordance with the invention, drive cards located therein out of the combined magnetic encoding and card flipping station as a consequence of the drive roller being offset from the axis of rotation of the combined magnetic encoding and card flipping station. The driving of the card out of the combined magnetic encoding and card flipping station as a result of flipping is compensated for by the single drive motor driving the transmission to produce a component of motion of the card within the combined magnetic encoding and card flipping station, opposite in direction to the component of motion caused by flipping, to cancel the component of motion caused by the flipping thereby leaving the card properly positioned and centered within the combined magnetic encoding and card flipping station.

A system for processing cards including a magnetic medium extending along one side of the cards and printing on both sides of the cards includes a plurality of card processing stations spaced along a card transport extending between a card input and a card output with the stations comprising a combined magnetic encoding and a card flipping station which encodes the magnetic medium and which flips individual cards as held by the combined magnetic encoding and card flipping station from one side after printing the one side to another side to permit printing on the another side of the cards, and a printing station which prints both sides of the cards; a first drive motor which drives a transmission coupling the motor to a card drive associated with each station to transport the cards at each station during processing thereof; a second drive motor which rotates the combined magnetic encoding and card flipping station from a first rotational position to a second rotational position displaced substantially 180° from the first rotational position to flip the cards contained in the combined magnetic encoding and card flipping station; and a controller which controls operation of the stations and the first and second motors so that cards are sequentially processed at the combined magnetic encoding and flipping station to encode the magnetic medium, to transport the cards to the printing station to print one of the sides thereof, to transport the cards back to the combined magnetic encoding and flipping station where the cards are flipped to a reverse orientation of the sides of the cards for printing on the another side of the cards and to transport the cards back to the printing station to print on the another side of the cards. The plurality of card processing stations may include a smart card encoding station located between the input and the combined magnetic encoder and card flipping station; and wherein the first drive motor may drive the transmission to drive a card drive at the smart card encoding station and the controller causes the cards to be transported by the first motor and transmission from the input to the smart encoding station by the transmission driving the card drive of the smart encoding station where an integrated circuit associated each card is encoded and then each card with the associated encoded integrated circuit is transported to the combined magnetic encoding and flipping station for processing. The card drive of the combined magnetic encoding and flipping station may comprise a drive roller, which drives cards in forward and reverse directions along the card transport relative to the printing station, that is driven by the transmission in a rotational direction to maintain the cards positioned within and centered in the combined magnetic encoding and flipping station during rotation between the first and second rotational positions. An idler roller may be opposed to the drive roller with the cards at the combined magnetic encoding and flipping station being disposed between the idler roller and the drive roller; and a rotational axis about which the combined magnetic encoding and flipping station may rotate between the first and second rotational positions which is at a centerline of the combined magnetic encoder and flipping station. The centerline may be aligned with a path along which the cards move along the transport card when the combined magnetic encoding and flipping station is in the first and second rotational positions.

A combined magnetic encoder and flipper which encodes a magnetic medium on one of two sides of cards which are printed on the two sides includes a magnetic encoder which engages a side of the cards containing the magnetic medium for encoding data on the magnetic medium; an idler roller opposed to the magnetic encoder which engages a side of the cards opposite to a side containing the magnetic medium; a card drive including a driven roller which engages one of the sides of the cards and an opposed idler roller which engages another of the sides of the cards to drive the cards during encoding of data on the magnetic medium; and a first motor which rotates the combined magnetic encoder and flipper from a first rotational position to a second rotational position rotated substantially 180° relative to the first rotational position during the printing of the two sides of the cards about an axis of rotation which is at a centerline of the combined magnetic encoder and flipper with an axis of rotation of the driven roller being offset from the centerline. A second motor may drive a transmission which drives the driven roller; and a controller which may control rotation of the first motor so that during flipping of the cards each card is maintained positioned and centered within the combined magnetic encoder and flipper during rotation of the combined magnetic encoder and flipper between the first and second rotational positions. The centerline may be aligned with a card transport extending through the combined magnetic encoder and flipper along which the cards move during encoding of the magnetic medium when the combined magnetic encoder and flipper is in the first and second rotational positions. The control of rotation of the second motor may add a component of motion of the cards relative to a position of the cards in the combined magnetic encoder and flipper which substantially cancels an opposite component of motion caused by rotation of the combined magnetic encoder and flipper between the first and second rotational positions.

A plurality of systems in accordance with the invention may be serially connected so that each of the plurality of serially connected systems may be connected such that cards which are fed from the printing stations, except a last printing station of the plurality of serially connected systems, are fed to a card input of a next of the plurality of serially connected systems.

In a system for processing cards including a magnetic medium extending along one side of the cards and printing on both sides of the cards including a plurality of card processing stations spaced along a card transport extending between a card input and a card output with the stations comprising a combined magnetic encoding and a card flipping station which encodes the magnetic medium and which flips individual cards as held by the combined magnetic encoding and card flipping station from one side after printing the one side to another side to permit printing on the another side of the cards, and a printing station which prints both sides of the cards, a first drive motor which drives a transmission coupling the motor to a card drive associated with each station to transport the cards at each station during processing thereof, a second drive motor which rotates the combined magnetic encoding and card flipping station from a first rotational position to a second rotational position displaced substantially 180° from the first rotational position to flip the cards contained in the combined magnetic encoding and card flipping station, and a controller which controls operation of the stations and the first and second motors, a method in accordance with the invention includes sequentially processing the cards at the combined magnetic encoding and flipping station to encode the magnetic medium, transporting the cards to the printing station to print one of the sides, transporting the cards back to the combined magnetic encoding and flipping station where the cards are flipped to a reverse orientation of the sides of the cards for printing on the another side of the cards and transporting the cards back to the printing station to print the another side of the cards. The plurality of card processing stations may include a smart card encoding station located between the input and the combined magnetic encoder and card flipping station; and wherein the first drive motor drives the transmission to drive a card drive at the smart card encoding station and the controller causes the cards to be transported by the first motor and transmission from the input to the smart encoding station by the transmission driving the card drive of the smart encoding station where an integrated circuit associated each card is encoded and then each card with the associated encoded integrated circuit is transported to the combined magnetic encoding and flipping station for processing. The card drive of the combined magnetic encoding and flipping station may comprise a drive roller, which drives cards in forward and reverse directions along the card transport relative to the printing station, that is driven by the transmission in a rotational direction to maintain the cards positioned within the combined magnetic encoding and flipping station during rotation between the first and second positions. An idler roller may be opposed to the drive roller with the cards at the combined magnetic encoding and flipping station being disposed between the idler roller and the drive roller; and a rotational axis about which the combined magnetic encoding and flipping station rotates between the first and second positions may be at a centerline of the combined magnetic encoder and flipping station. The centerline may be aligned with a path along which the cards move along the card transport when the combined magnetic encoding and flipping station is in the first and second rotational positions.

In a combined magnetic encoder and flipper which encodes a magnetic medium on one of two sides of cards which are printed on the two sides including a magnetic encoder which engages a side of the cards containing the magnetic medium for encoding data on the magnetic medium, an idler roller opposed to the magnetic encoder which engages a side of the cards opposite to a side containing the magnetic medium and a card drive including a driven roller which engages one of the sides of the cards and an opposed idler roller which engages another of the sides of the cards to drive the cards during encoding of data on the magnetic medium, a method in accordance with the invention includes using a first motor to rotate the combined magnetic encoder and flipper from a first rotational position to a second rotational position rotated substantially 180° relative to the first rotational position during the printing of the two sides of the cards about an axis of rotation which is at a centerline of the combined magnetic encoder and flipper with an axis of rotation of the driven roller being offset from the centerline. A second motor may drive a transmission which drives the driven roller; and a controller may be used to control rotation of the first motor so that during flipping of the card, each card is maintained positioned within the combined magnetic encoder and flipper during rotation of the combined magnetic encoder and flipper between the first and second rotational positions. The centerline may be aligned with a card transport extending through the combined magnetic encoder and flipper along which the cards move during encoding of the magnetic recording medium when the combined magnetic encoder and flipper is in the first and second rotational positions. The control of rotation of the second motor may add a component of motion of the cards relative to a position of the cards in the combined magnetic encoder and flipper which substantially cancels an opposite component of motion caused by rotation of the combined magnetic encoder and flipper between the first and second rotational positions.

BRIEF DESCRIPTION OF THE DRAWINGS

FIGS. 3A and 3B respectively illustrate a block diagram of card processing entities and an electrical block diagram of the present invention.

FIGS. 7–9 illustrate an operational sequence of the flipping of the combined magnetic encoding and flipping station of the present invention for reversing the orientation of the sides of the card to position a card to print on the second side.

Like reference numerals identify like parts throughout the drawings.

DESCRIPTION OF THE PREFERRED EMBODIMENTS

Figure 3A:
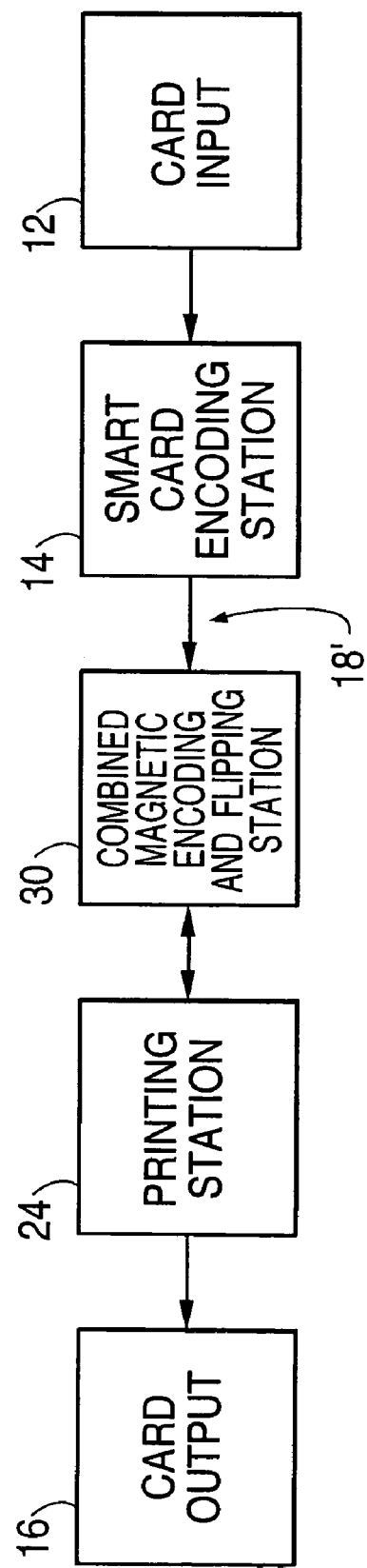

FIG. 3A illustrates a block diagram of an embodiment of the invention including serially connected card processing stations which are a smart card encoding station 14 of conventional design, a combined magnetic encoding and flipping station 30 and in accordance with the invention, a conventional printing station 24 through which cards are transported by a card transport 18' in accordance with the invention. Cards such as, but not limited to, those as described above in conjunction with FIGS. 1A and 1B, are fed from a card input 12 at which they are picked and fed by the card transport 18' to the smart card encoding station 14 which is a well-known design and therefore, not described in detail. Without limitation, the smart card encoding station may be a smart card encoding station utilized by the Assignee's Imagemaster™ card printing system. Individual cards move along the card transport 18' which connects together the aforementioned stations as illustrated in FIG. 3A. Cards are fed from the card input 12 by a picker (not illustrated) where they are engaged by the card transport 18 and fed to the smart card encoding station 14. The card transport 18' described below feeds the cards between the various stations under the power of card drives located at various points along the card transport as illustrated in FIGS. 4–6 and 10.

Each card drive includes a power driven roller as described below which contacts one side of a card and an idler roller, which is opposed to the power driven roller, and contacts the opposite side of the card. A first drive motor 54 drives a transmission 61 illustrated in FIGS. 4–6 and 10 as described below which drives each of the aforementioned card drives located at various points along the card transport path 18.

Figure 1A:
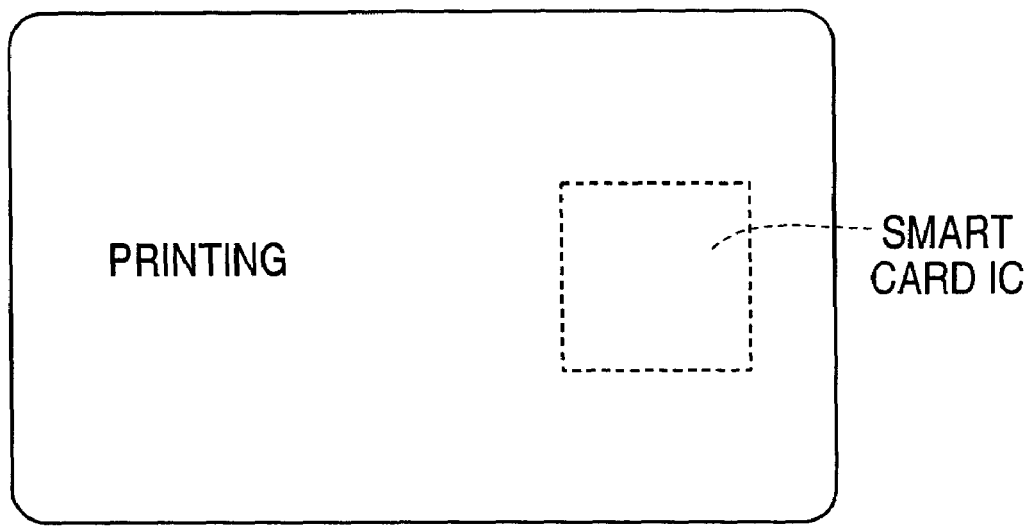
FIGS. 1A and 1B illustrate an example of a prior art card of the type which may be processed in accordance with the present invention which has printing on two sides and a magnetically encoded magnetic stripe on one side and optionally may include a smart card integrated circuit incorporated therein.
Figure 4:
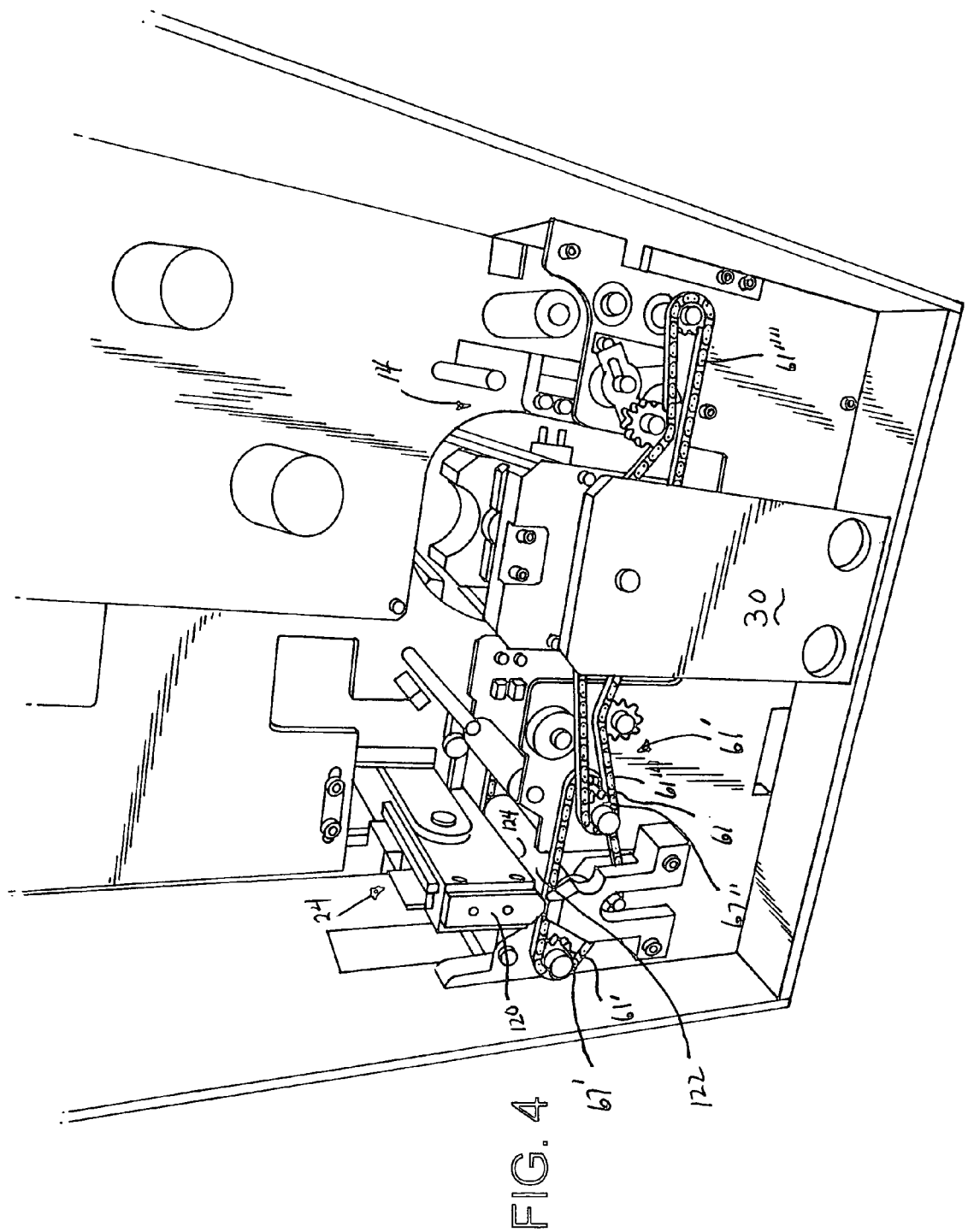
FIG. 4 illustrates a partial perspective view of the embodiment of the present invention.
Figure 5:
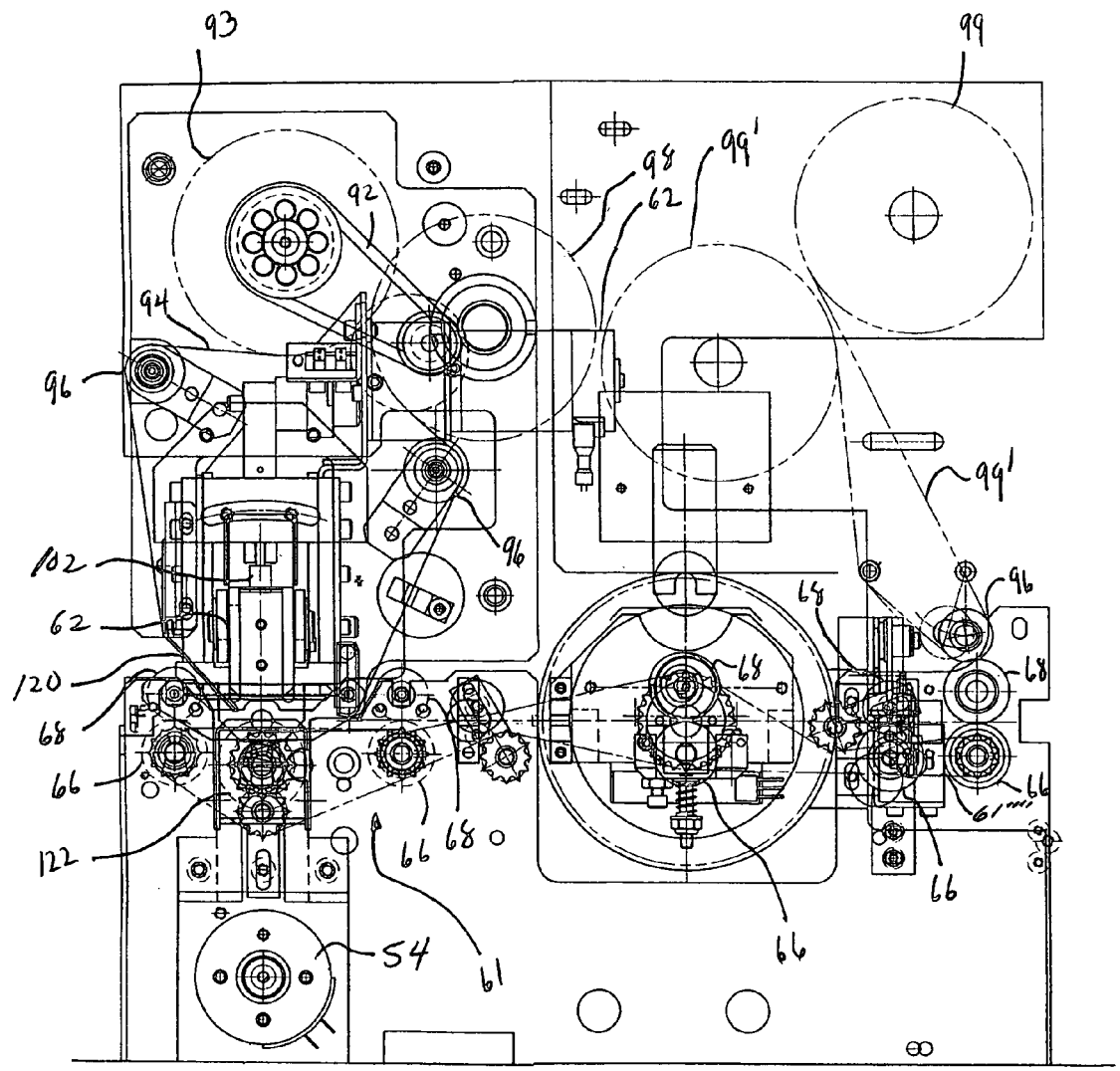
FIG. 5 illustrates a partial front elevational view of an embodiment of the present invention.

The smart card encoding station 14 encodes information on a smart card IC, such as that illustrated in FIG. 1A, to include diverse types of data which may be utilized in applications of the processed card in accordance with the invention including phone cards, identification cards, SIM cards, etc. The individual cards at the smart card encoding station 14, after encoding, are tested by a system controller 50, illustrated in FIG. 3B, to see if the information encoded therein has been correctly encoded in the IC memory. If any errors are detected, the card is identified to the system as being an erroneously encoded card such that it will be rejected so that it is not stacked in the card output 16. The card transport 18' moves the cards from the smart card encoding station 14 to the combined magnetic encoding and flipping station 30 which is described in detail hereinbelow with reference to FIGS. 4–10. At the combined magnetic encoding and flipping station 30, a magnetic medium, such as the magnetic stripe illustrated in FIG. 1B, which faces downward relative to FIGS. 4 and 5, is magnetically encoded with data. The first motor 54 of FIG. 3B and transmission 61, illustrated in FIGS. 4–6 and 10 drives the card drives associated with the card processing stations and at various points along the transport path 18', will initially move the card in a forward direction to magnetically encode the length of the stripe (track) with data and then reverse the cards back to the beginning position of the magnetic encoding of the stripe to determine if the data has been properly encoded in a manner which is well known such as with the Assignee's credit card embossing and printing systems. If the data is determined to be erroneously magnetically encoded, the card is identified to the system as being erroneously magnetically encoded which will cause the system to reject the card so that it is not stacked in the card output 16 which contains only error free encoded smart cards encoded and magnetically encoded cards. The card transport 18' moves the magnetically encoded card to the printing station 24, which may be of any well known design, for printing of the top surface as illustrated, for example, in FIG. 1A. The printing may be in accordance with any text, image, or graphics stored in a data file stored in the memory 52 which is accessed by the system controller 50 as described below with reference to FIG. 3B. The printing station 24, in a preferred embodiment, utilizes a commercially available plastic foil 94 which is coated with a thermally activated ink as, for example, discussed above in conjunction with FIGS. 1A and 1B, which is fused into the top surface of the plastic card by the heating of the heating elements of the print head 120. A print head 120, (illustrated in FIGS. 4 and 5) of the printing station 24, reciprocates downward to contact the card which is supported by an underlying roller platen 122. As a card is moved through the printing station 24 by the card transport 18', an array of heating elements (not illustrated) within the print head 120 contact the top side of the foil 94 when the head is reciprocated downward so that pressure is applied by the head to print a linear array of individual pixels of print information extending across the width of the card in a longitudinal sequential manner by activating selected heating elements of the linear array so that the card is printed with the text, graphics or other information as the card moves from right to left. At the same time as the linear array of individual heating elements of the print head 120 are being rapidly heated to print individual rows of pixels across the width of the card, the foil 94 is indexed by a foil advance motor 58 (only illustrated in FIG. 3B) so that new thermally activated ink coated on the side of the foil facing the top surface of the card is available for being heat fused onto the top surface of the card. This process, as stated above, is well known and does not form part of the present invention.

After the top side of the card is printed, the first drive motor 54 which drives the transmission 61, as described below, causes the card transport 18' to activate the card drives including driven rollers 66 at the individual stations to reverse transport of the card back to the combined magnetic encoding and flipping station 30 at which the card is flipped substantially 180° so as to orient the side, that was the bottom side during the printing of the first side as described above, to face upward so as to be in an orientation to face the print head 120 of the printing station 24. As will be described in more detail below, during the flipping of the card, the first drive motor 54 is activated to move the transport of cards by the card transport 18' in the forward direction so as to cancel the effect of the flipping operation to drive the card held in the combined magnetic encoding and flipping station 30 in the reverse direction toward the smart card encoding station 14. The net result is that, during flipping, the activation of the first drive motor 54, which drives the transmission to cause the card transport 18' to drive the individual card drives, drives the cards with a component of motion in the forward direction which cancels the component of motion in the reverse direction toward the smart card encoding station 14 caused by the flipping operation, thus keeping the card centered within the flipper. Thereafter, the flipped card, with the bottom side containing the magnetic stripe facing up, is transported by the card transport 18' to the printing station 24 where the bottom side is now printed with printing, graphics or other information, in the same manner as the printing of the first side as described above. Thereafter, the card is transmitted to the card output 16 by a conventional stacker powered by a picker, stacker and reject motor 60 as described below. If, as described above, there is a detected error at the smart card encoding station 14 or the combined magnetic encoding and flipping station 30, the picker, stacker and reject motor 60 causes the card to be discharged below the card output 16 as a "reject". With the present invention, a single motor 60 powers the picking, stacking and rejecting operations in a conventional manner.

Figure 1B:
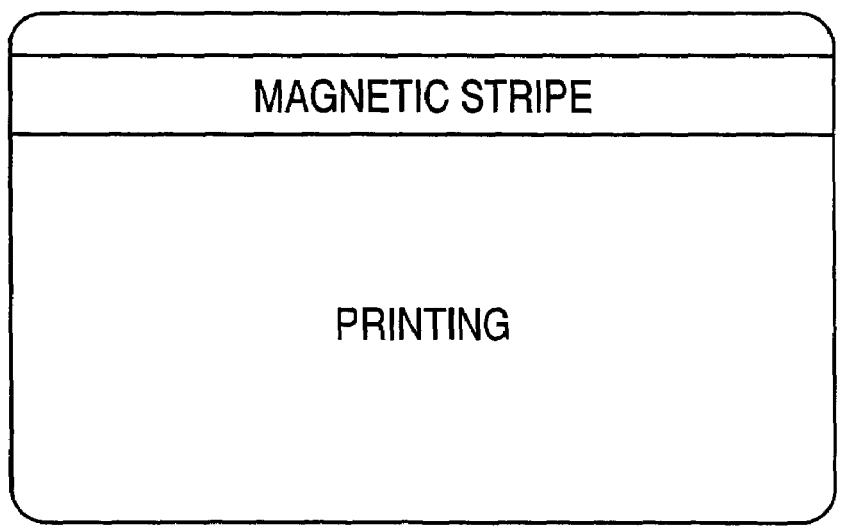

FIG. 3B illustrates an electrical block diagram of the embodiment of the invention described above with respect to FIG. 3A. A system controller 50 coordinates the operation of the card input 12 at which cards are picked from a stack of blank cards, operation of the smart card encoding station 14, movement of cards along the card transport 18', operation of the combined magnetic encoding information 30, operation at the printing station 24 and operation of the card output 16, at which cards are stacked or forwarded to another printing system which is serially connected thereto as described below with reference to FIG. 10. The controller 50 may be a programmed microprocessor or PC. A memory for card data 52 supplies files of data associated with individual cards, which are utilized by the smart card encoding station 14, for encoding information stored in the integrated circuit contained in the smart card being processed, which are utilized by the combined magnetic encoding and flipping station 30 to encode the magnetic medium, such as the magnetic stripe as illustrated in FIG. 1B, and which are utilized by the card printing station 24 to supply the information to be printed on both sides of the card. The individual bit maps are stored in association with individual cards so that the processing of data is coordinated by the system. The controller 50 is responsive to various card sensors including sensors located at the smart card encoding station 14, combined magnetic encoding and flipping station 30 and printing station 24, the card input 12 and the card output 16, which are not discussed individually, to detect the location of the card relative to reference input and output positions of these stations. The aforementioned sensors are used to coordinate the overall processing of cards. Positioning of the cards at a reference starting point of the combined magnetic encoding and flipping station 30 coordinates the position at which data, that is encoded on the magnetic stripe, is required to start which may be in accordance with ISO standards. The printing of the top and bottom sides of cards requires the same location precision as the encoding of the magnetic medium such as on the magnetic stripe.

The invention utilizes first and second drive motors. The first drive motor 54 is the motor which drives the card transport 18' in forward and reverse directions by means of a chain drive transmission 61 having multiple loops of chain 61', 61", 61'" and 61"" engaging sprockets 67', 67", 67'" and 67"" which drive the axles of driven rollers 66 of the card drives as described above and below. The second drive motor 56 performs the flipping of the combined magnetic encoding and flipping station 30 in a first direction which is counterclockwise for substantially 180° in order to flip the card to print the second side of the card and then in the reverse clockwise direction, to reorient the combined magnetic encoding and flipping station so as to receive the next card such that its topside will be oriented to be printed by the printing station 24.

The controller 50 communicates with the stations 14, 24, and 30 so as to provide the required smart card encoding data to the smart card encoding system 14, the required data to be encode the magnetic medium at the combined magnetic encoding and flipping station 30 and the required print data to the printing station 24, and furthermore, to receive communications from the sensors at all of the stations to indicate their operational status. The controller 50 also controls a foil advance motor 58 (not illustrated in FIGS. 5 and 10), which takes up foil 94 coated with thermally fixable ink from a supply reel 98 so as to present fresh foil beneath the linear array of individual heating elements of the printing matrix of the print head 120 to print rows of pixels along the length of the card while the card is being transported through the printing station 24 by the card transport 18'. The controller 50 also controls a printer, stacker and reject motor 60 which performs the aforementioned picking, stacking and reject operations, which are conventionally performed regarding the printing of cards. The controller 50 controls the print head reciprocation motor 62, which reciprocates the print head 120 for printing of each card including the heat activated elements which print rows of pixels from a withdrawn position down into a position contacting the backside of the foil 94, so as to apply pressure against the backside of the foil through each card against the roller platen 122 so that the front side of the foil contacts the face of each card being printed. The controller 50 also controls a motor (not illustrated in FIG. 3B) which rotates takeup reel 99 for a roll of debris cleaning tape 99' to be drawn into contact with the right most idler roll 68 at the smart encoding station 14(the first processing station) to remove debris which are captured by contact of idler roller with the top side of the cards.

Figure 10:
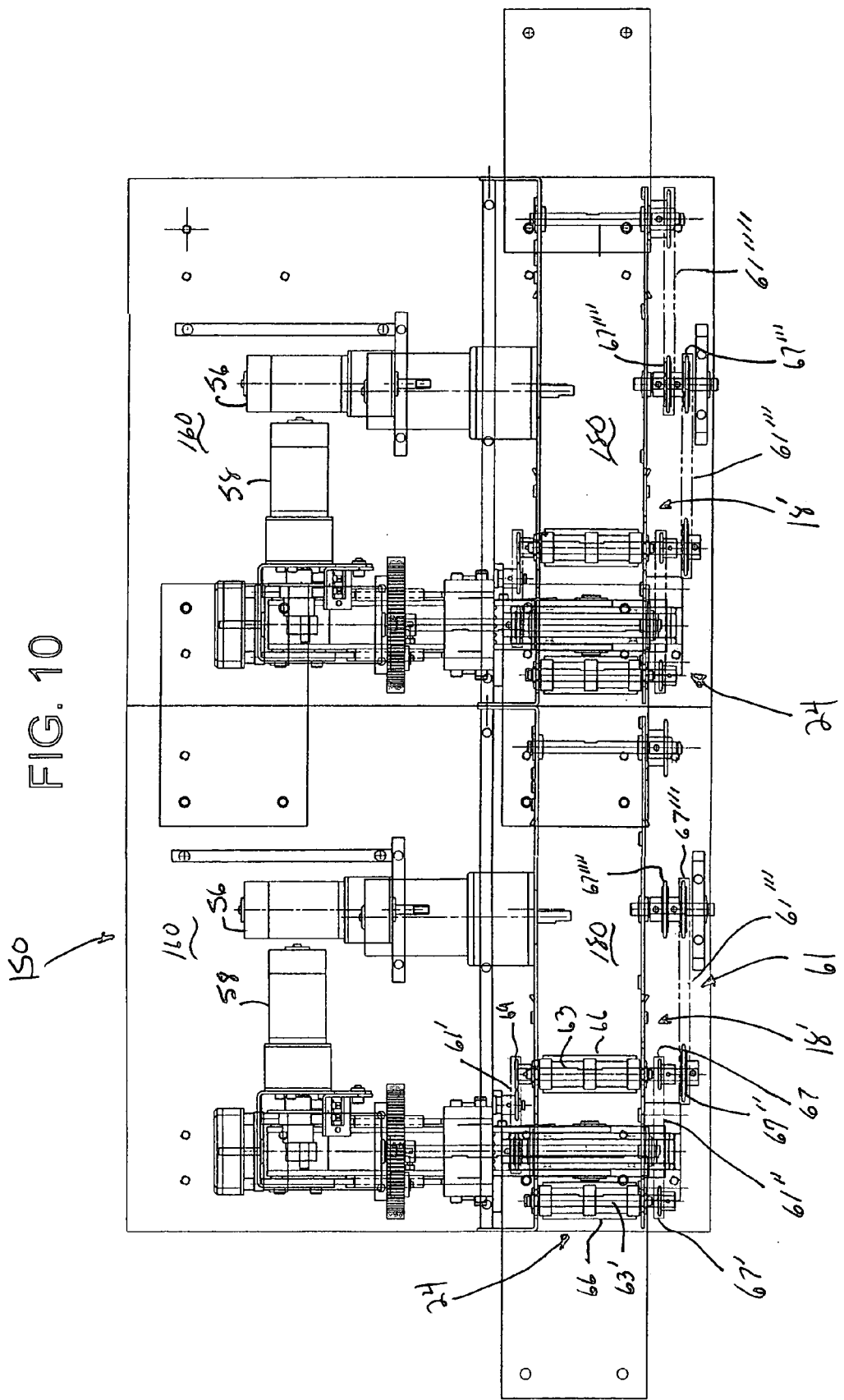
FIG. 10 is a partial view of serially connected systems in accordance with FIGS. 1–9 of the present invention which perform multiple printing operations or coating on each of the sides of cards which are processed in accordance with the present invention, such as color printing or performing clear coating after printing of two sides.

FIGS. 4 and 5 respectively illustrate a partial perspective view and a partial front elevational view of an embodiment of the present invention and FIG. 10 illustrates a partial top view of serially connected printing systems in accordance with FIGS. 1–9. The drive rollers 66 contact an underneath side of the card and the opposing idler rollers 68 contact the other side of the card to apply sufficient pressure permitting a frictional drive of the cards through the various stations when the first motor 54 is activated to activate the transmission 61 to drive the driven rollers 66 to move the cards in the forward or reverse directions as described above in the operational sequence of two-sided printing.

The first drive motor 54 supplies power for driving the cards along the transport path 18' by a series of chain loops 61', 61", 61'" and 61"" which drive sprockets 67', 67", 67'" and 67"", which are connected to axles of the drive rollers 66, which engage a bottom side of the cards.

With reference to FIGS. 4–6 and 10, the chain transmission 61 includes a first chain loop 61' located behind the transport path which, through sprocket 69, drives axle 63, which drives roller 66 attached thereto. A sprocket 67 connected to axle 63 drives a second chain loop 61" located in front of the transport path 18', which drives a sprocket 67' connected to the axle 63' of the left most driven roller 66.

Figure 6:
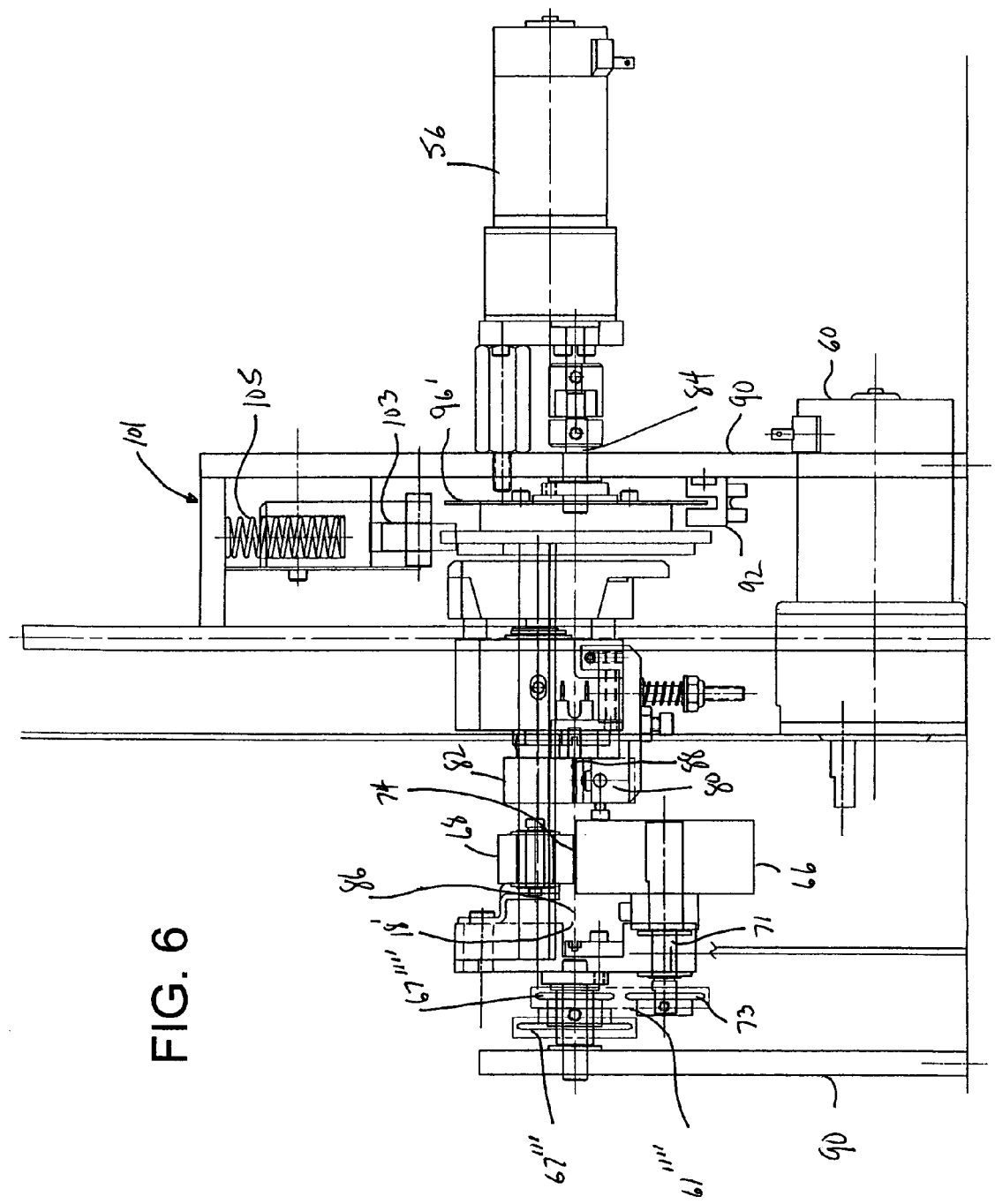
FIG. 6 illustrates a partial end view of the combined magnetic encoding and flipping station of the present invention viewed from the right side of FIG. 5.

Another sprocket 67" is attached to the front of axle 63, which drives a third chain loop 61''', that drives sprocket 67''' associated with the combined magnetic encoding and flipping station 30. As seen in FIG. 6, a sprocket 67''', mounted inboard to the outer sprocket 67''', drives a fourth chain loop 61'''', which drives sprocket 73, that drives axle 71, which drives driven roller 66. The fourth chain loop 61'''' also drives the driven roller 66 of the smart card encoding station 14. The individual cards fit between the nip 74 of the driven roller 66 and the idler roller 68, which is located at centerline 86 about which the combined magnetic encoding and flipping station 30 rotates, which also intersects the path of the cards along the card transport 18'.

With respect to FIG. 6, flipping of the combined magnetic encoding and flipping station 30 is driven by the second drive motor 56 under the control of controller 50. Rotation of the combined magnetic encoding and flipping station 30 is first counterclockwise substantially through 180°, as illustrated sequentially in FIGS. 7–9 from a first rotational position to a second rotational position and then clockwise substantially 180° back to the first rotational position to position the combined magnetic encoding and flipping station at an orientation to receive the next card from the smart card encoding station 14 with the magnetic stripe facing downward so as to permit the magnetic encoding head 80, which is well known, to encode the magnetic stripe. An idler roller 82 is opposed to the magnetic encoding head 80 so as to apply pressure to the card to position the magnetic medium facing downward in surface contact with the top of the magnetic encoding head when the card moves through the nip 74 under the power of the driven roller 66 as provided by the transmission 61 which rotates the chain loops 61'–61''' under the power of the first motor 54. The second motor 56 has an output shaft 84 which drives the combined magnetic encoding and flipping station 30 for rotation about the centerline 86 which is coincident with the card transport 18' and the nip 74 between the driven roller 66 and the idler roller 68 and the nip 88 between the magnetic head 80 and the idler roller 82. The magnetic encoding head 80 is well known and may be the same assembly as the Assignee's Imagemaster™ printing system or model Advantage™ embossing systems.

The structural assembly of the combined magnetic encoding and flipping station 30 is supported for rotation in endplates 90. Sensor 92 senses a cut out in disk 96' to detect the home rotational position of the combined magnetic encoding and flipping station 30 at which the first face of the cards to be printed is held in a position facing the print head 120. A spring loaded detect mechanism 101 biases a follower 103 which is under pressure applied by spring 105, to engage a cut out 107, which captures the rotation of the combined magnetic encoding and flipping station 40 at the first and second rotational positions, which are rotationally separated by substantially 180° as illustrated in FIGS. 7–9. Surface 109 has a sharper top edge which provides a coasting stop to the return clockwise rotation (not illustrated) to the first rotational position.

If the first drive motor 54 was not activated during the flipping of the combined magnetic encoding and flipping station 30, as illustrated in FIGS. 7–9, the fixing of the sprocket 73 by the chain loop 61''' being stationary would cause the sprocket 73 attached to the axle 71 to rotate in view of its location off center from the centerline 86 as the combined magnetic encoding and flipping station 30 rotates through 180° to flip a card held between the nip 74 of the driven roller 66 and the idler roller 68. This action would displace the card out of the nip 74 toward the upstream smart card encoding station 14 which would interfere with flipping operation of the card in view of the card no longer being centered within the combined magnetic encoding and flipping station 30. As a result, the controller 50 synchronously, with the combined magnetic encoding and flipping station 30 being rotated counterclockwise by the second motor 56, causes the first motor 54 to drive the chain loop 61''' in a direction to cause the sprocket 73 to rotate in the opposite direction to compensate for the component of motion of the card toward the smart card encoding station 14 caused by the rotation of the driven roller 66 produced by the counter-clockwise rotation of the combined magnetic encoding and flipping station 30.

With reference to FIG. 5, the advance of foil 94 is by means of a belt drive 92 driven by the foil advance motor 58 (only illustrated in FIG. 3B) which drives takeup reel 93 that pulls the foil 94 around a series of idler rollers 96 from a supply roll 98. The print head 120, which is conventional high definition thermally activated array of heating elements, reciprocates to print each card under the control of print head reciprocation motor 62, which drives an eccentric cam (not illustrated) so as to reciprocate rod 102 from a raised position (not illustrated) to a lowered position at which printing occurs. Roller platen 122, supports the bottom side of the card against pressure exerted by the print head matrix against the top of the card through the foil 94 which is disposed between the thermally activated individual elements of the print head which prints the pixels on the face of the card and the card which is being printed. The structure of the print head 120 is not described in detail in view of it being conventional other than to point out its reciprocation from a raised position when individual cards are not having their faces printed to a lowered position where the individual cards have their faces printed, while the foil advance motor 58 causes the foil to be pulled through the nip 124 between the print head matrix and the platen 122.

FIG. 6 illustrates the picker, stacker and reject motor 60 (the structure of picker, stacker and card reject has been omitted since it is well known) which powers the picker to provide cards from the card input 12, the stacking of cards at the card output 16 and the rejecting of cards. The cards are not stacked into the card output when processing errors are detected regarding either the integrated circuit encoding at the smart card encoding station 14 or the magnetic encoding of magnetic medium at the combined magnetic encoding and flipping station 30.

FIGS. 7–9 illustrate respectively the sequence of rotating the combined magnetic encoding and flipping station 30 through substantially 180° from a position at which printing of the top first side of a card 126 occurs with the magnetic stripe positioned in a downward direction so as to permit magnetic encoding on the bottom side, rotation of the combined magnetic encoding and flipping station through approximately 90° as illustrated in FIG. 8 and rotation of the combined magnetic encoding and flipping station through substantially 180° where the card is reversed in orientation to permit printing on the second side of the card having the magnetic medium which was initially facing downward for printing of the first side. Although not illustrated, after the card transport 18' has transported the card from the combined magnetic encoding and flipping station 30, as illustrated in FIG. 9, the controller 58 causes the second drive motor 56 to rotate the combined magnetic encoding and flipping station substantially 180° clockwise so as to coast to engage stop 109 to perform positioning of the combined magnetic encoding and flipping station in a home position to accept the next card from the card input 12 with its magnetic medium facing downward.

Figure 2:
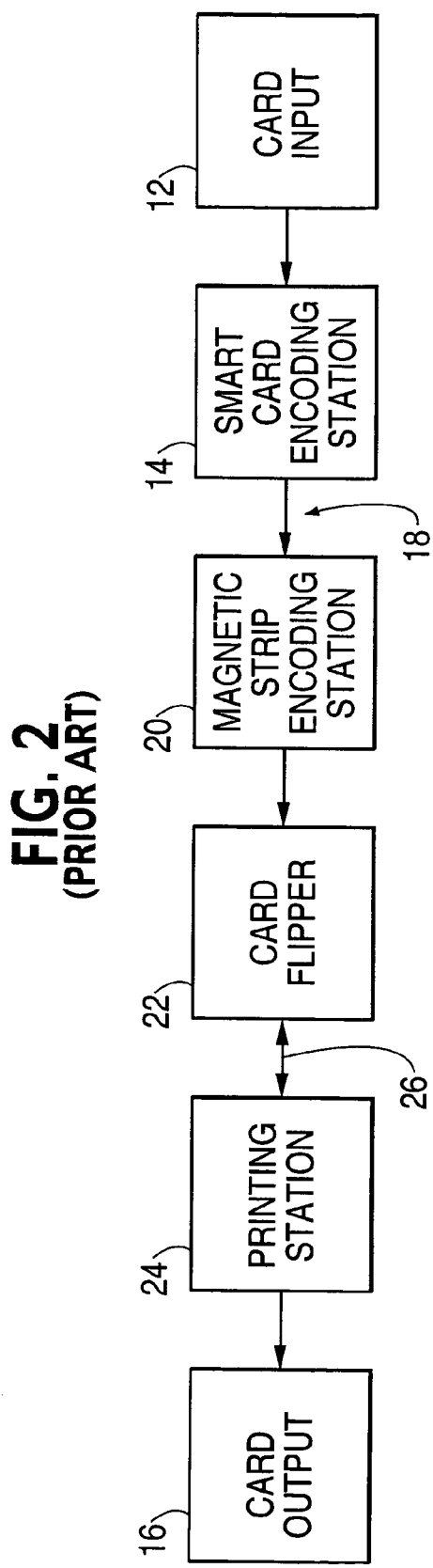
FIG. 2 illustrates a block diagram of a prior art card processing system.

As may be seen from a comparison of FIG. 2 with FIGS. 4, 5 and 10, the card flipper 22 of the prior art has been eliminated by incorporation of the flipping function within the combined magnetic encoding and flipping station 30 thereby shortening the card transport path 18' of the card printing system. This shortening of the length of the card transport length 18' produces a more compact printing system which facilitates usage in small spaces, such as on a desktop, and further permits serial connection of multiple systems together with the card transport 18' being shortened in length by a product of the length of the eliminated card flipper 22 times the number of serially connected units.

FIG. 10, which is a partial view, illustrates a card processing system 150 which is comprised of multiple serially connected individual card processing systems 160 in accordance with FIGS. 1–9. While, as illustrated in FIG. 10, there are only two serially connected systems 160, in practice, the number of serially connected systems may be any number, such as four, wherein three primary color inks are printed on both sides of a card followed by clear coating of both sides by a fourth system. Each of the individual systems 160 are connected along a continuous in-line card transport 180 in which the individual card transports 18' are aligned such that the cards are fed from the output 16 of each system, except a last printing station 24 of the plurality of serially connected systems, to a card input 12 of a next of the plurality of serially connected systems. It should be understood that FIG. 10 does not illustrate the structural details of the present invention as described more completely above with respect to FIGS. 4–6 with only a top view being illustrated which is symbolic of the more detailed construction of the individual systems as described above.

While the invention has been described in terms of its preferred embodiments, it should be understood that numerous modifications may be made thereto without departing from the spirit and scope of the present invention. It is intended that all such modifications fall within the scope of the appended claims.

What is claimed is:

1. A system for processing cards including a magnetic medium extending along one side of the cards and printing on both sides of the cards comprising:

a plurality of card processing stations spaced along a card transport extending between a card input and a card output with the stations comprising a combined magnetic encoding and a card flipping station which encodes the magnetic medium and which flips individual cards as held by the combined magnetic encoding and card flipping station from one side after printing the one side to another side to permit printing on the another side of the cards, and a printing station which prints both sides of the cards;

a first drive motor which drives a transmission coupling the motor to a card drive associated with each station to transport the cards at each station during processing thereof;

a second drive motor which rotates the combined magnetic encoding and card flipping station from a first rotational position to a second rotational position displaced substantially 180° from the first rotational position to flip the cards contained in the combined magnetic encoding and card flipping station; and a controller which controls operation of the stations and the first and second motors so that cards are sequentially processed at the combined magnetic encoding and flipping station to encode the magnetic medium, to transport the cards to the printing station to print one of the sides thereof, to transport the cards back to the combined magnetic encoding and flipping station where the cards are flipped to a reverse orientation of the sides of the cards for printing on the another side of the cards and to transport the cards back to the printing station to print on the another side of the cards.

2. A system in accordance with claim 1 wherein:

the plurality of card processing stations include a smart card encoding station located between the input and the combined magnetic encoder and card flipping station; and wherein the first drive motor drives the transmission to drive a card drive at the smart card encoding station and the controller causes the cards to be transported by the first motor and transmission from the input to the smart encoding station by the transmission driving the card drive of the smart encoding station where an integrated circuit associated each card is encoded and then each card with the associated encoded integrated circuit is transported to the combined magnetic encoding and flipping station for processing.

3. A system for processing cards in accordance with claim 2 comprising:

a plurality of serially connected systems in accordance with claim 2, each of the plurality of serially connected systems being connected such that cards which are fed from the printing stations, except a last printing station of the plurality of serially connected systems, are fed to a card input of a next of the plurality of serially connected systems.

4. A system in accordance with claim 2 wherein:

the card drive of the combined magnetic encoding and flipping station comprises a drive roller, which drives cards in forward and reverse directions along the card transport relative to the printing station, that is driven by the transmission in a rotational direction to maintain the card positioned within the combined magnetic encoding and flipping station during rotation between the first and second rotational positions.

5. A system in accordance with claim 4 comprising:

an idler roller opposed to the driven roller with the cards at the combined magnetic encoding and flipping station being disposed between the idler roller and the drive roller; and a rotational axis about which the combined magnetic encoder and flipping station rotates between the first and second rotational positions is at a centerline of the combined magnetic encoding and flipping station.

6. A system in accordance with claim 5 wherein:

the centerline is aligned with a path along while the cards move along the card transport when the combined magnetic encoding and flipping station is in the first and second rotational positions.

7. A system for processing cards in accordance with claim 6 comprising:

a plurality of serially connected systems in accordance with claim 6, each of the plurality of serially connected systems being connected such that cards which are fed from the printing stations, except a last printing station of the plurality of serially connected systems, are fed to a card input of a next of the plurality of serially connected systems.

8. A system for processing cards in accordance with claim 5 comprising:
a plurality of serially connected systems in accordance with claim 5, each of the plurality of serially connected systems being connected such that cards which are fed from the printing stations, except a last printing station of the plurality of serially connected systems are fed to a card input of a next of the plurality of serially connected systems.

9. A system for processing cards in accordance with claim 4 comprising:
a plurality of serially connected systems in accordance with claim 4, each of the plurality of serially connected systems being connected such that cards which are fed from the printing stations, except a last printing station of the plurality of serially connected systems, are fed to a card input of a next of the plurality of serially connected systems.

10. A system in accordance with claim 1 wherein:
the card drive of the combined magnetic encoding and flipping station comprises a drive roller, which drives cards in forward and reverse directions along the card transport relative to the printing station, that is driven by the transmission in a rotational direction to maintain the cards positioned within the combined magnetic encoding and flipping station during rotation between the first and second rotational positions.

11. A system in accordance with claim 10 comprising:
an idler roller opposed to the drive roller with the cards at the combined magnetic encoding and flipping station being disposed between the idler roller and the drive roller; and
a rotational axis about which the combined magnetic encoding and flipping station rotates between the first and second rotational positions is at a centerline of the combined magnetic encoder and flipping station.

12. A system in accordance with claim 11 wherein:
the centerline is aligned with a path along which the cards move along the transport card when the combined magnetic encoding and flipping station is in the first and second rotational positions.

13. A system for processing cards in accordance with claim 12 comprising:
a plurality of serially connected systems in accordance with claim 12, each of the plurality of serially connected systems being connected such that cards which are fed from the printing stations, except a last printing station of the plurality of serially connected systems, are fed to a card input of a next of the plurality of serially connected systems.

14. A system for processing cards in accordance with claim 11 comprising:
a plurality of serially connected systems in accordance with claim 11, each of the plurality of serially connected systems being connected such that cards which are fed from the printing stations, except a last printing station of the plurality of serially connected systems, are fed to a card input of a next of the plurality of serially connected systems.

15. A system for processing cards in accordance with claim 10 comprising:
a plurality of serially connected systems in accordance with claim 10, each of the plurality of serially connected systems being connected such that cards which are fed from the printing stations, except a last printing station of the plurality of serially connected systems, are fed to a card input of a next of the plurality of serially connected systems.

16. A system for processing cards in accordance with claim 1 comprising:
a plurality of serially connected systems in accordance with claim 1, each of the plurality of serially connected systems being connected such that cards which are fed from the printing stations, except a last printing station of the plurality of serially connected systems, are fed to a card input of a next of the plurality of serially connected systems.

17. A combined magnetic encoder and flipper which encodes a magnetic medium on one of two sides of cards which are printed on the two sides comprising:
a magnetic encoder which engages a side of the cards containing the magnetic recording medium for encoding data on the magnetic medium;
an idler roller opposed to the magnetic encoder which engages a side of the cards opposite to a side containing the magnetic medium;
a card drive including a driven roller which engages one of the sides of the cards and an opposed idler roller which engages another of the sides of the cards to drive the cards during encoding of data on the magnetic medium; and
a first motor which rotates the combined magnetic encoder and flipper from a first rotational position to a second rotational position rotated substantially 180° relative to the first rotational position during the printing of the two sides of the cards about an axis of rotation which is at a centerline of the combined magnetic encoder and flipper with an axis of rotation of the driven roller being offset from the centerline.

18. A combined magnetic encoder and flipper in accordance with claim 17 comprising:
a second motor which drives a transmission which drives the driven roller; and
a controller which controls rotation of the first motor so that during flipping of the cards each card is maintained positioned within the combined magnetic encoder and flipper during rotation of the combined magnetic encoder and flipper between the first and second rotational positions.

19. A combined magnetic encoder and flipper in accordance with claim 18 wherein:
the centerline is aligned with a card transport extending through the combined magnetic encoder and flipper along which the cards move during encoding of the magnetic recording medium when the combined magnetic encoder and flipper is in the first and second rotational positions.

20. A combined magnetic encoder and flipper in accordance with claim 19 wherein:
the control of rotation of the second motor adds a component of motion of the cards relative to a position of the cards in the combined magnetic encoder and flipper which substantially cancels an opposite component of motion caused by rotation of the combined magnetic encoder and flipper between the first and second rotational positions.

21. A combined magnetic encoder and flipper in accordance with claim 18 wherein:
the control of rotation of the second motor adds a component of motion of the cards relative to a position of the cards in the combined magnetic encoder and flipper which substantially cancels an opposite component of motion caused by rotation of the combined magnetic encoder and flipper between the first and second rotational positions.

22. In a system for processing cards including a magnetic medium extending along one side of the cards and printing on both sides of the cards including a plurality of card processing stations spaced along a card transport extending between a card input and a card output with the stations comprising a combined magnetic encoding and a card flipping station which encodes the magnetic medium and which flips individual cards as held by the combined magnetic encoding and card flipping station from one side after printing the one side to another side to permit printing on the another side of the cards, and a printing station which prints both sides of the cards, a first drive motor which drives a transmission coupling the motor to a card drive associated with each station to transport the cards at each station during processing thereof, a second drive motor which rotates the combined magnetic encoding and card flipping station from a first rotational position to a second rotational position displaced substantially 180° from the first rotational position to flip the cards contained in the combined magnetic encoding and card flipping station, and a controller which controls operation of the stations and the first and second motors a method comprising:

sequentially processing the cards at the combined magnetic encoding and flipping station to encode the magnetic medium, transporting the cards to the printing station to print one of the sides, transporting the cards back to the combined magnetic encoding and flipping station where the cards are flipped to a reverse orientation of the sides of the cards for printing on the another side of the cards and transporting the cards back to the printing station to print on the another side of the cards.

23. A method in accordance with claim 22 wherein:

the plurality of card processing stations include a smart card encoding station located between the input and the combined magnetic encoder and card flipping station; and wherein the first drive motor drives the transmission to drive a card drive at the smart card encoding station and the controller causes the cards to be transported by the first motor and transmission from the input to the smart encoding station by the transmission driving the card drive of the smart encoding station where an integrated circuit associated each card is encoded and then each card with the associated encoded integrated circuit is transported to the combined magnetic encoding and flipping station for processing.

24. A system in accordance with claim 23 wherein:

the card drive of the combined magnetic encoding and flipping station comprises a drive roller, which drives cards in forward and reverse directions along the card transport relative to the printing station, that is driven by the transmission in a rotational direction to maintain the card positioned within the combined magnetic encoding and flipping station during rotation between the first and second positions.

25. A system in accordance with claim 24 wherein:

an idler roller is opposed to the driven roller with the cards at the combined magnetic encoding and flipping station being disposed between the idler roller and the drive roller; and a rotational axis about which the combined magnetic encoder and flipping station rotates between the first and second positions is at a centerline of the combined magnetic encoding and flipping station.

26. A method in accordance with claim 22 wherein:

the card drive of the combined magnetic encoding and flipping station comprises a drive roller, which drives cards in forward and reverse directions along the card transport relative to the printing station, that is driven by the transmission in a rotational direction to maintain the cards positioned within the combined magnetic encoding and flipping station during rotation between the first and second positions.

27. A system in accordance with claim 26 wherein:

an idler roller is opposed to the drive roller with the cards at the combined magnetic encoding and flipping station being disposed between the idler roller and the drive roller; and a rotational axis about which the combined magnetic encoding and flipping station rotates between the first and second positions is at a centerline of the combined magnetic encoder and flipping station.

28. A method in accordance with claim 27 wherein:

the centerline is aligned with a path along which the cards move along the card transport when the combined magnetic encoding and flipping station is in the first and second rotational positions.

29. A system in accordance with claim 26 wherein:

the centerline is aligned with a path along which the coils move along the card transport when the combined magnetic encoding and flipping station is in the first and second rotational positions.

30. In a combined magnetic encoder and flipper which encodes a magnetic medium on one of two sides of cards which are printed on the two sides including a magnetic encoder which engages a side of the cards containing the magnetic medium for encoding data on the magnetic medium, an idler roller opposed to the magnetic encoder which engages a side of the cards opposite to a side containing the magnetic medium and a card drive including a driven roller which engages one of the sides of the cards and an opposed idler roller which engages another of the sides of the cards to drive the cards during encoding of data on the magnetic medium, a method comprising:

using a first motor to rotate the combined magnetic encoder and flipper from a first rotational position to a second rotational position rotated substantially 180° relative to the first rotational position during the printing of the two sides of the cards about an axis of rotation which is at a centerline of the combined magnetic encoder and flipper with an axis of rotation of the driven roller being offset from the centerline.

31. A method in accordance with claim 30 comprising:

a second motor which drives a transmission which drives the driven roller; and using a controller to control rotation of the first motor so that during flipping of the card, each card is maintained positioned within the combined magnetic encoder and flipper during rotation of the combined magnetic encoder and flipper between the first and second rotational positions.

32. A method in accordance with claim 31 wherein:

the centerline is aligned with a card transport extending through the combined magnetic encoder and flipper along which the cards move during encoding of the magnetic recording medium when the combined magnetic encoder and flipper is in the first and second rotational positions.

33. A method in accordance with claim 32 wherein:

the control of rotation of the second motor adds a component of motion of the cards relative to a position of the cards in the combined magnetic encoder and flipper which substantially cancels an opposite component of motion caused by rotation of the combined magnetic encoder and flipper between the first and second rotational positions.

34. A method in accordance with claim 31 wherein:

the control of rotation of the second motor adds a component of motion of the cards relative to a position of the cards in the combined magnetic encoder and flipper which substantially cancels an opposite component of motion caused by rotation of the combined magnetic encoder and flipper between the first and second rotational positions.

* * * * *